United States Patent [19]

Yeo

[11] Patent Number: 5,234,699

[45] Date of Patent: Aug. 10, 1993

[54] FEED COMPOSITION FOR BREEDING PIGS WITH N-3 FATTY ACID-ACCUMULATED PORK

[75] Inventor: Young Keun Yeo, Taegu, Rep. of Korea

[73] Assignees: Woobang Land Co., Ltd.; Kyungpook Nat. University, both of Taegu, Rep. of Korea

[21] Appl. No.: 899,323

[22] Filed: Jun. 16, 1992

[30] Foreign Application Priority Data

Aug. 20, 1991 [KR] Rep. of Korea .................. 91-14292

[51] Int. Cl.$^5$ ............................................. A23K 1/00
[52] U.S. Cl. ........................................ 426/2; 426/541; 426/601; 426/623; 426/630; 426/646; 426/807
[58] Field of Search .................. 426/2, 601, 656, 807, 426/623, 630, 646, 541

[56] References Cited

U.S. PATENT DOCUMENTS

| | | | |
|---|---|---|---|
| 4,497,840 | 2/1985 | Gould et al. | 426/619 |
| 4,789,664 | 12/1988 | Seligson | 426/607 |
| 5,106,639 | 4/1992 | Lee et al. | 426/72 |

OTHER PUBLICATIONS

Yeo et al., Lipids, vol. 25, No. 12 (1990) pp. 811–814.
Yeo et al., Biochimica et Biophysica Acta. 1006 (1989) pp. 9–14.
Yeo et al., Biochimica et Biophysica Acta. 1001 (1989) pp. 25–30.

*Primary Examiner*—R. B. Penland
*Attorney, Agent, or Firm*—Birch, Stewart, Kolasch & Birch

[57] ABSTRACT

A feed composition for breeding pigs contains about 70 to 90% by weight of an n-3 fatty acid source, about 10 to 20% by weight of a carbohydrate source, about 0.1 to 1.0% by weight of an agent for promoting a decrease in the level of cholesterol, and about 0.1 to 1.0% of an antioxidant.

21 Claims, No Drawings

FEED COMPOSITION FOR BREEDING PIGS WITH N-3 FATTY ACID-ACCUMULATED PORK

BACKGROUND OF THE INVENTION

1. Field of the Invention

The present invention relates to a feed composition for breeding pigs in order to produce pork rich in n-3 fatty acid and more particularly, to a feed containing about 70 to 90% by weight of an n-3 fatty acid source, about 10 to 20% by weight of carbohydrate source, about 0.1 to 1.0% by weight of an agent for promoting a decrease in the cholesterol level, and about 0.1 to 1.0% by weight of an antioxidant, which is rich in n-3 fatty acid which is beneficial to humans and further can prevent various physiological disorders caused by pork having a high n-6 fatty acid content.

2. Description of the Prior Art

In pork presently on the market, the content of n-3 fatty acid is around 1% and the content of n-6 fatty acid is approximately 15 to 30%. Unfortunately, n-6 fatty acid may act as to cause various adverse physiological effects. For this reason, the field of Chinese medicine has warned against the bad effects of pork and the general public has often been warned to avoid the intentional intake of pork.

As shown in Table 1 below, $18:2_{n-6}$ as n-6 fatty acid is metabolized to arachidonic acid which is then further metabolized in the cell membranes of body tissues. It has been recognized that various metabolites produced due to the excessive intake of n-6 fatty acids, i.e., eicosanoids such as 2-series prostaglandins and 4-series leukotrienes, may cause various physiological disorders such as atherosclerosis, hypertension, myocardial infarction, ischemia, thrombosis, heart disease, osteomyelitis and skin disease.

However, $18:3_{n-3}$ as n-3 fatty acid is converted into eicosapentaenoic acid (EPA) in the cell membrane of body tissue and then EPA produces 3-series prostaglandins and 5-series leukotrienes through metabolism.

The 3-series prostaglandins and 5-series leukotrienes thus produced block the production of 2-series prostaglandins and 4-series leukotrienes produced by the metabolism of arachidonic acid, and thus prevent various physiological disorders caused by excessive 2-series prostaglandins and 4-series leukotrienes. Further, n-3 fatty acid itself blocks the metabolic pathway of n-6 fatty acid, as shown in Table 2 below, and therefore, inhibits the production of eicosanoids from n-6 fatty acid.

TABLE 1

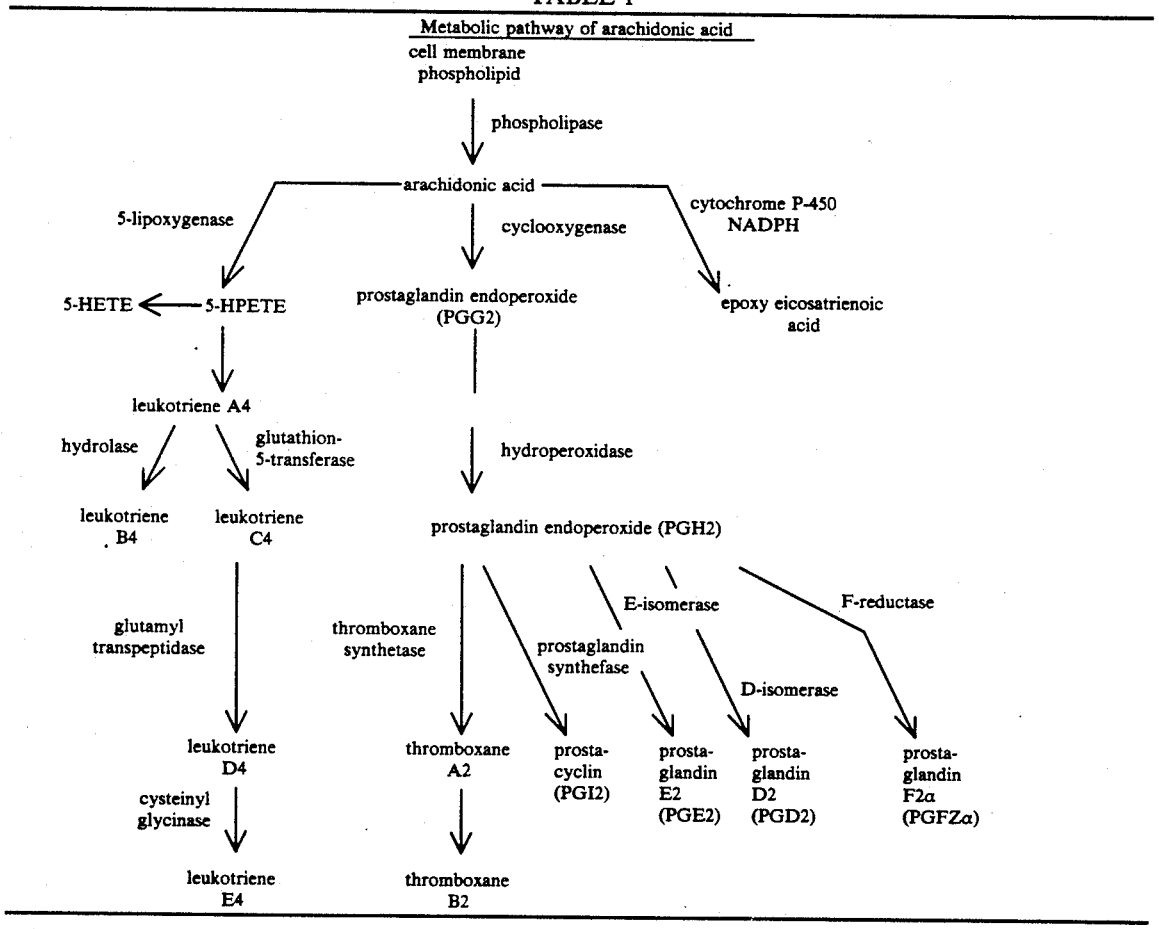

TABLE 2

Inhibition of n−6 fatty acid metabolic pathway by n−3 fatty acid

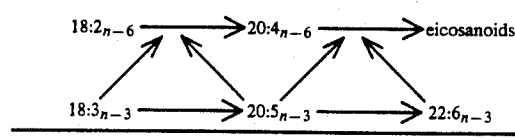

In Biochimica et Biophysica Acta (1989) 1001:25–30, the present inventors have reported that when EPA as n-3 fatty acid is administered to a Sprague-Dawley rat, the amount of arachidonic acid, as n-6 fatty acid, present in cell membranes, is reduced drastically.

In another reference, Biochimica et Biophysica Acta (1989) 1006:9–11, the present inventors reported, as the result of investigation on the biosynthesis of various fatty acids in experimental animals to which EPA is administered and then ($^3$H) glycerol is injected, that the synthesis of arachidonic acid as n-6 fatty acid is drastically reduced whereas the content of EPA and DHA (docosahexaenoic acid) as n-3) fatty acid increases significantly.

Furthermore, the present inventors disclose in Lipids (1990) 25:811–814, that after EPA administration, the biosynthesis of liver fat in Sprague-Dawley rats decreased by about 40 percent.

SUMMARY OF THE INVENTION

Accordingly, it is an object of the present invention to provide a feed composition for breeding animals having pork rich in n-3 fatty acid.

Another object of the present invention is to provide a feed composition for pigs used as a source of pork, which contains about 70 to 90% by weight of an n-3 fatty acid source, about 10 to 20% by weight of a carbohydrate source, about 0.1 to 1.0% by weight of an agent for promoting a decrease in the level of cholesterol, and about 0.1 to 1.0% by weight of an antioxidant, for breeding pigs used as a source of pork rich in n-3 fatty acid by supplying pigs with the present feed composition from 7 to 15 days prior to slaughtering.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a feed composition for breeding pigs, which contains about 70 to 90% by weight of a n-3 fatty acid source, about 10 to 20% by weight of a carbohydrate source, about 0.1 to 1.0% by weight of an agent for promoting a decrease in the level of cholesterol, and about 0.1 to 1.0% of an antioxidant.

DESCRIPTION OF THE PREFERRED EMBODIMENTS

Referring now in detail to the present invention, there is provided a feed composition for breeding pigs having pork rich in n-3 fatty acid, which contains about 70 to 90% by weight of a n-3 fatty acid source, about 10 to 20% by weight of a carbohydrate source, about 0.1 to 1.0% of an agent for promoting a decrease in the level of cholesterol, and about 0.1 to 1.0% by weight of an antioxidant.

The present inventors have studied the results of previous experiments on the metabolism of n-6 fatty acid and n-3 fatty acid in large animals, i.e., pigs, to invent a feed composition which can most effectively reduce the content of n-6 fatty acid in pork without any adverse effects.

The present inventors have succeeded in reducing drastically the content of n-6 fatty acid and, instead, increased the content of n-3 fatty acid several ten-fold by administering the feed composition of the present invention to pigs. In addition, the feed composition of the present invention decreases drastically the content of saturated fatty acids and cholesterol, and it can therefore even prevent various consequences due to saturated fatty acids, such as for example, increases in human cholesterol levels and the like.

Specifically, the present inventors have developed a feed composition for pigs, which contains linseed containing about 50% α-linolenic acid as n-3 fatty acid in the extracted oil therefrom, perilla seed containing about 60% linolenic acid, wheat, barley, oats, fish meal, salt, an antioxidant, dicalcium phosphate and limestone.

It has been disclosed that when the feed composition of the present invention is administered to pigs for only 10 days after 10 days of adjusting the feeding-period, in the fillet portion of pigs the content of n-3 fatty acid increases several ten-fold, whereas the content of n-6 fatty acid is significantly reduced, in comparison with pork from pigs in a control group which are fed conventional feed on the market.

Heretofore, many experiments similar to the present invention have been carried out in a number of countries. However, in all experiments, the individually developed n-3 fatty acid-containing feed compositions have been supplied to the pigs from the piglet stage to the slaughter stage. As a result, there are the disadvantages that the growth rate decreases and, especially, the oxidation of feed cannot be prevented from the root thereof and therefore the breeding cost increases.

However, even in the case wherein the feed composition of the present invention is fed to a pig for only 10 days, the pork contains several ten-fold more n-3 fatty acid than that of the control group. Therefore, the feed composition of the present invention has the advantages of reducing pig breeding costs, high feeding efficiency and allowance for a very normal growth rate.

In contrast to pigs fed with the commercially available common feed, the subcutaneous fat tissue of pigs fed with the feed composition of the present invention is very thin, and the content of n-3 fatty acid is much higher, whereas the content of n-6 fatty acid is significantly reduced.

Thus, by intake of meat produced from pigs fed with the feed composition of the present invention, it can be expected that various physiological disorders caused by arachidonic acid, which is an n-6 fatty acid, are prevented and further treated, and the occurrence of the adverse effects due to the excessive intake of pork are reduced. Thus, according to the present invention, the acceptability of eating pork can be improved and, therefore, nutritious pork as a good n-3 fatty acid source can be widely eaten.

The absorption into the pig's body is the most important factor which should be considered in preparing the feed composition. Compared to the general feed composition presently on the market, the feed composition of the present invention contains a specific fatty acid.

Accordingly, such a different composition may cause a change in the pig's taste and a further reduction of internal absorption. For this reason, the conventional n-3 fatty-acid-containing feed compositions are fed to pigs from the beginning of breeding to slaughtering time and, therefore, create the burden of enormous breeding costs.

In addition, conventional feed compositions show a tendency to cause tardy growth because of the unfitness for native pig taste and low body absorbancy, and therefore, have not been welcomed by hog farmers.

The present inventors have investigated the means for overcoming the above-mentioned disadvantages of the prior feed compositions. As a result, the present inventors determined that in order to increase the body absorbancy of a feed composition, it is preferred to adjust the proportions of fatty acid and protein so as to be identical to each other or to increase the proportion of protein to fatty acid, and further that other kinds of n-3 fatty acid sources are preferably incorporated into the feed composition because the large administration of the only one feeding component may cause nutritional imbalance.

In view of this, the present inventors created an optimal feed composition and confirmed its effect through many experiments, and thus now have completed the present invention.

In the present invention, linseed and perilla seed are used in a mixing ratio of 100:1-10 as a source of n-3 fatty acid. In the prior impractical n-3 fatty acid-enriched feed compositions, perilla cake, rape seed, fish meal and the like are used as n-3 fatty acid sources. However, these components cause some problems due to a comparatively low n-3 fatty acid content and low body absorbancy and further, such compositions are uneconomical because of the required long-term feeding procedure from the young pig to the slaughter stage.

Linseed used in the present invention is inexpensive and has a high body absorbancy because it contains about 25% protein which is higher than that in other n-3 fatty acid sources. However, when only linseed is used as the n-3 fatty acid source, nutritional imbalance may result. Therefore, in the present invention, linseed is blended with a small amount of perilla seed which has a relatively lower protein content and a higher n-3 fatty acid content compared to linseed, and suits a pig's taste very well. According to this, as demonstrated by experiments, the feed composition of the present invention maintains the balance between protein and fatty acid, and provides for various nutrients moderately, and thus can increase the weight gaining effect.

In blending linseed with perilla seed, if the proportion of perilla seed in the blend is below 1%, the blending of perilla seed has no significant effect, whereas if the proportion of perilla seed is greater than 10%, the proportion of fatty acid is higher than that of protein and thus is unsuitable. In addition, the content of the n-3 fatty acid source thus composed above is preferably about 70 to 90% of the total feed composition. If the content of the n-3 fatty acid source is below 70%, the substitution effect of fatty acid in the pork is lowered, and if the content is greater than 90%, the feed composition of the preset invention exhibits a low weight gaining effect because of the low body absorbancy of the feed and the nutritional imbalance, and thus is uneconomical. The more preferred n-3 fatty acid source contains, in addition to linseed and perilla seed, about 2 to 5% of fish meal having a high EPA and DHA content and, therefore, can efficiently produce the accumulation of EPA and DHA in the body. Thus, an n-3 fatty acid source composed of linseed, perilla seed and fish meal in a ratio of 100:1 - 10:2 - 5 causes the best substitution effect on fatty acids.

It is most preferable that the above-mentioned n-3 fatty acid source accounts for 75 to 85% by weight of the total feed composition. As a source of carbohydrates, conventional cereals, for example, wheat, barely, etc., are used in the mixture. In order to promote the decrease of cholesterol level, oats are blended in an amount of about 0.1–1.0% in the total composition.

Another feature of the composition of the present invention is the use of santoquin as an antioxidant for feed. This antioxidant is inexpensive and also plays a biological role in the pig, as well as in the feed composition, to prevent the oxidative decomposition of n-3 fatty acid and the spoilage of feed during long-term storage.

Further features of the present invention are associated with the administration time of the present feed composition. As a result of many breeding experiments, it has been discovered that when the feed composition of the present invention is supplied for approximately 7 to 15 days before slaughtering the pig, the desired high quality pork rich in n-3 fatty acid can be obtained. However, supplying the present feed composition prior to 15 days from slaughtering is uneconomical, and a supply period shorter than 7 days does not greatly increase the n-3 fatty acid content in the pork.

As described above, the feed composition of the present invention does not cause a decrease in the rate of weight gain of pigs due to the change of feed, since it is supplied for a short period. The feeding of the feed composition of the present invention rapidly decreases the content of n-6 fatty acid in the pork within a short period and, instead, increases the content of n-3 fatty acid, which is an essential fatty acid for the human body and also acts as an inhibitor against n-6 fatty acid and its metabolites, and further decreases greatly the content of saturated fatty acids and cholesterol, which may cause various sequelae. Therefore, by utilizing the feed composition of the present invention, a high quality pork can be obtained.

The detailed embodiment of the present invention is illustrated in the following examples. However, it should be understood that the scope of the present invention is not limited to the matters described in these examples in any way.

EXAMPLE 1

Preparation of n-3 fatty acid-enriched feed composition for pig

| Components | | Ratio (wt. %) |
|---|---|---|
| n-3 fatty acid source | ○ Linseed | 76.0 |
| | ○ Perilla seed | 2.0 |
| | ○ Fish meal | 4.0 |
| Carbohydrate source | ○ Wheat | 13.0 |
| | ○ Barley | 2.0 |
| Agent for decreasing cholesterol | ○ Oats | 0.3 |
| Antioxidant | ○ Santoquin | 0.1 |
| Others | ○ Salt | 0.3 |
| | ○ Limestone | 1.0 |
| | ○ Dicalcium phosphate | 1.0 |
| | ○ Vitamin mixture | 0.2 |
| | ○ Mineral mixture | 0.1 |
| | Total | 100.0% |

All components as mentioned above are blended uniformly in the given ratios to prepare the pig feed composition of the present invention.

Experiment 1: Comparative test for growth rate (weight gaining rate) utilizing the pig feed composition of the present invention 34 pigs (species: LY (Landsace-Yorkshire) hybrid) are divided into three groups. The first and second groups are fed with two kinds of commercially available feedstuff for pigs, and the third group is fed with the feed composition as prepared in Example 1. In all three groups, pigs are given freely the feed compositions for 10 days after a 10 day adjustment period and then the weight gains are determined. The results are given in Table 3.

determined. As a result, the total lipid content in each organ, except for subcutaneous fat and seam fat which are, on the whole, composed only of lipid, is shown in Table 4.

TABLE 4

Total lipid content (mg/g of tissue) in each organ of pigs of the first and second groups (commercial feeds A and B, respectively) and the third group (feed composition of Example 1)

| | Meat | | | Liver | | | Heart | | | Kidney | | |
|---|---|---|---|---|---|---|---|---|---|---|---|---|
| | First Group | Second Group | Third Group | First Group | Second Group | Third Group | First Group | Second Group | Third Group | First Group | Second Group | Third Group |
| Total lipid content (mg/g of tissue) | 32.91 | 34.59 | 24.96 | 53.43 | 52.71 | 40.55 | 38.84 | 46.04 | 26.53 | 34.82 | 39.66 | 27.09 |
| | Average 33.75 | | | Average 53.07 | | | Average 42.44 | | | Average 37.24 | | |

Note:
All the numerical values mean the average value in each group.

TABLE 3

Pig growth rate (10 days feeding) with commercial feed compositions (control groups) and the feed composition of the present invention (test group)

| First Group (Commercial feed A) | | | Second Group (Commercial feed B) | | | Third Group (Feed of Example 1) | | |
|---|---|---|---|---|---|---|---|---|
| Weight (kg) | | Weight gain (kg) | Weight (kg) | | Weight gain (kg) | Weight (kg) | | Weight gain (kg) |
| Before feeding | After feeding | | Before feeding | After feeding | | Before feeding | After feeding | |
| 53 | 64 | 11 | 63 | 75 | 12 | 46 | 58 | 12 |
| 50 | 63 | 13 | 45 | 59 | 14 | 57 | 71 | 14 |
| 51 | 62 | 11 | 57 | 70 | 13 | 52 | 64 | 12 |
| 60 | 72 | 12 | 71 | 86 | 15 | 52 | 66 | 14 |
| 61 | 74 | 13 | 59 | 67 | 8 | 62 | 68 | 6 |
| 59 | 71 | 12 | 57 | 66 | 9 | 55 | 68 | 13 |
| 50 | 62 | 12 | 59 | 69 | 10 | 60 | 72 | 12 |
| 51 | 66 | 15 | 55 | 66 | 11 | 50 | 61 | 11 |
| 45 | 52 | 7 | 49 | 60 | 11 | 51 | 64 | 13 |
| 55 | 66 | 11 | 47 | 60 | 13 | 56 | 70 | 14 |
| 61 | 73 | 23 | 69 | 82 | 13 | | | |
| 64 | 78 | 14 | 55 | 66 | 11 | | | |
| 55.0 | 66.9 | 11.9 | 57.1 | 68.8 | 11.7 | 54.1 | 66.2 | 12.1 |

In this test, feeds A and B used for comparison are the most frequently used two products among various commercially available feed compositions.

From the results given in Table 3, it can be seen that the average weight gain is 11.9 kg in the first group, 11.7 kg in the second group and 12.1 kg in the third group. That is, there is no difference in weight gain among three groups.

Experiment 2: Comparative test for lipid content in each organ of pig fed with the commercial feeds and the feed composition of the present invention Pigs fed in the above Experiment 1 are slaughtered and then divided into halves. Thereafter, meat between the 11th and 13th ribs, abdominal subcutaneous fat, seam fat in the shoulder, liver, heart and kidney are isolated and the total lipid content in each portion is As shown in Table 4, the total lipid contents in meat, liver, heart and kidney of pigs belonging to the third group are decreased by 26.0%, 23.6%, 37.5% and 27.3%, respectively, as compared with those in the first and second groups fed with the commercial feed compositions. Accordingly, it is seen that the feed composition of the present invention has an effect on the prevention of excessive fat accumulation in all organs including meat and also is effective for increase of the relative proportion of meat to fat tissue.

Experiment 3: Comparative test for fatty acid composition in each organ of pigs fed with commercial feed compositions and the feed composition of the present invention The fatty acid composition in total fat extracted from each organ isolated in Experiment 2 is analyzed. As a result of this analysis, the contents of n-6 fatty acid and n-3 fatty acid are given in Table 5.

TABLE 5

Fatty composition (n-6/n-3 fatty acid ratio) in each organ of pigs fed with commercial feed compositions (the first and second groups) and the feed composition of the present invention (the third group)

| First Group | Second Group | Third Group | First Group | Second Group | Third Group | First Group | Second Group | Third Group |
|---|---|---|---|---|---|---|---|---|
| Meat | | | Subcutaneous fat | | | Seam fat | | |

TABLE 5-continued

Fatty composition (n-6/n-3 fatty acid ratio) in each organ of pigs fed with commercial feed compositions (the first and second groups) and the feed composition of the present invention (the third group)

| | First Group | Second Group | Third Group | First Group | Second Group | Third Group | First Group | Second Group | Third Group |
|---|---|---|---|---|---|---|---|---|---|
| Fatty acid ratio (n-6/n-3) | 13.6 | 2.1 | | 14.7 | 2.6 | | 14.2 | 2.5 | |
| | Liver | | | Heart | | | Kidney | | |
| Fatty acid ratio (n-6/n-3) | 22.7 | 1.0 | | 21.0 | 1.9 | | 21.4 | 1.8 | |

Wherein all the numerical values mean the average value in each group.

As shown from the n-6/n-3 fatty acid ratios given in Table 5, in the first and second groups as control groups fed with the commercial feed compositions, the proportion of n-6 fatty acid is significantly greater than that of n-3 fatty acid. However, in the n-6/n-3 fatty acid ratio in each organ of the third group, pigs fed with the feed composition of the present invention, the proportion of n-3 fatty acid is rapidly increased.

Pork produced from pigs fed with the feed composition of the present invention has a small content of n-6 fatty acid but is rich is n-3 fatty acid. Therefore, by intake of such pork, various physiological disorders due to n-6 fatty acid can be prevented, n-3 fatty acid is accumulated in the body to inhibit the metabolism of n-6 fatty acid and therefore, and any sequela caused by excessive n-6 fatty acid intake can be treated. Since the n-6 fatty acid/n-3 fatty acid ratio decreases, the physiological balance of the human body can be maintained.

Therefore, it is understood that pork contains excessive saturated fatty acids and n-6 fatty acid. Accordingly, when many people ingest pork, they generally remove the fatty layer of pork. Pork produced from pigs fed with the feed composition of the present invention does not require one to remove the fatty layer and further, the intake of such pork can provide a balance of fat for human metabolism.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A feed composition for breeding pigs, which consists essentially of about 70 to 90% by weight of linseed and perilla seed in a ratio of 100:1 to 10, about 10 to 20% by weight of a carbohydrate source, about 0.1 to 1.0% by weight of an agent for promoting a decrease in the level of cholesterol, and about 0.1 to 1.0% by weight of santoquin.

2. The feed composition of claim 1, further consists essentially of 2 to 5% by weight of fish meal.

3. The feed composition of claim 1, wherein oats are used as said agent for promoting said decrease in the level of cholesterol.

4. The feed composition of claim 1, wherein said linseed and perilla seed is about 75 to 85% by weight of said feed composition.

5. The feed composition of claim 1, wherein said linseed contains about 50% α-linolenic acid as n-3 fatty acid in oil extracted therefrom, and said perilla seed contains about 60% linolenic acid.

6. The feed composition of claim 1, wherein a n-3 fatty acid source further consisting essentially of linseed, perilla seed, and fish meal in a ratio of 100:1 to 10:2 to 5.

7. The feed composition of claim 1, wherein said a carbohydrate source consists essentially of conventional cereals.

8. The feed composition of claim 1, wherein said carbohydrate source is at least one member selected from the group consisting of wheat and barley.

9. A feed composition of claim 1, which further consists essentially of linseed containing about 50% α-linolenic acid as n-3 fatty acid in the oil extracted therefrom, perilla seed containing about 60% linolenic acid, wheat, barley, oats, fish meal, salt, santoquin, dicalcium phosphate, and limestone.

10. The feed composition of claim 9, wherein said fish meal is present in an amount of from 2 to 5% by weight of the total composition.

11. A feed composition of claim 1, which further consists essentially of, on a weight percentage basis:
76% linseed
2% perilla seed
4% fish meal
13% wheat
2% barley
0.3% oats
0.1% santoquin
0.3% salt
1.0% limestone
1.0% dicalcium phosphate
0.2% vitamin mixture, and
0.1% mineral mixture.

12. A method for breeding pigs containing pork rich in n-3 fatty acid, which comprises supplying to said pigs a feed composition consisting essentially of about 70 to 90% by weight of linseed and perilla seed in a ratio of 100:1 to 10, about 10 to 20% by weight of a carbohydrate source, about 0.1 to 1.0% by weight of an agent for promoting a decrease in the level of cholesterol, and about 0.1 to 1.0% by weight of an antioxidant for a period from 7 to 15 days prior to slaughtering.

13. The method of claim 12, wherein said feed composition further consisting essentially of 2 to 5% by weight of fish meal.

14. The method of claim 12, wherein oats are used as said agent for promoting a decrease in the level of cholesterol.

15. The method of claim 12, wherein said antioxidant is santoquin.

16. The method of claim 12, wherein said linseed and perilla seed is about 75 to 85% by weight of said feed composition.

17. The method of claim 12, wherein said carbohydrate source consisting essentially of conventional cereals.

18. The method of claim 12, wherein said carbohydrate source is at least one member selected from the group consisting of wheat and barley.

19. A method of claim 12 which comprises supplying to said pigs a feed composition consisting essentially of linseed containing about 50% α-linolenic acid as n-3 fatty acid in the oil extracted therefrom, perilla seed containing about 60% linolenic acid, wheat, barley, oats, fish meal, salt, santoquin, dicalcium phosphate, and limestone.

20. The method of claim 19, wherein said fish meal is present in an amount of from 2 to 5% by weight of the total composition.

21. A method of claim 12 which comprises supplying to said pigs a feed composition consisting essentially of
76% linseed
2% perilla seed
4% fish meal
13% wheat
2% barley
0.3% oats
0.1% santoquin
0.3% salt
1.0% limestone
1.0% dicalcium phosphate
0.2% vitamin mixture, and
0.1% mineral mixture for a period of from 7 to 15 days prior to slaughtering.

* * * * *